United States Patent [19]
Tanno et al.

[11] Patent Number: 5,214,633
[45] Date of Patent: May 25, 1993

[54] OPTICAL WAVEGUIDE RECORDING MEDIUM PLAYING APPARATUS

[75] Inventors: Naohiro Tanno, Yamagata; Teruo Toma; Kiyofumi Chikuma, both of Tsurugashima, all of Japan

[73] Assignee: Pioneer Electronic Corporation, Tokyo, Japan

[21] Appl. No.: 800,851

[22] Filed: Nov. 29, 1991

[30] Foreign Application Priority Data

Feb. 19, 1991 [JP] Japan .................... 3-24753

[51] Int. Cl.$^5$ .............................. G11B 7/00
[52] U.S. Cl. .................... 369/112; 369/116; 356/345
[58] Field of Search ............ 369/100, 112, 103, 116; 356/345, 346, 348, 349, 399

[56] References Cited

U.S. PATENT DOCUMENTS 4,995,726  2/1991  Fujita et al. ................. 356/359

FOREIGN PATENT DOCUMENTS 0276873  8/1988  European Pat. Off. .
0446063  9/1991  European Pat. Off. .

Primary Examiner—Paul M. Dzierzynski
Assistant Examiner—Drew A. Dunn
Attorney, Agent, or Firm—Sughrue, Mion, Zinn, Macpeak & Seas

[57] ABSTRACT

Disclosed is an optical waveguide recording medium playing apparatus which is characterized in that, in an optical system for reading and reproducing recorded information from an optical waveguide recording medium, an optical frequency modulating element for modulating light emitted from a super luminescent diode (SLD) as a light source is provided between the SLD and an objective lens for converging light on the photocoupler of the optical waveguide recording medium. The optical frequency modulating element comprises an ultrasonic light modulating element and a slit. The optical frequency modulating element drives the ultrasonic light modulating element with a frequency-modulated drive voltage to diffract the light from the SLD and limits the spatial spectrum of the diffracted light by means of the slit. Part of the diffracted light passes through the slit. As the voltage to drive the ultrasonic light modulating element is frequency-modulated, the pitch of an elastic wave formed in the ultrasonic light modulating element will be modulated. This varies the diffraction angle of the light of the same frequency, thus changing the frequency of light that passes through the slit. The optical system for generating reference light in heterodyne detection can therefore be miniaturized.

9 Claims, 3 Drawing Sheets

OPTICAL WAVEGUIDE RECORDING MEDIUM PLAYING APPARATUS

BACKGROUND OF THE INVENTION

1. Field of the Invention

The present invention relates to a playing apparatus which uses an optical recording medium, particularly an optical waveguide recording medium having an optical waveguide provided with refractive index discontinuous portions to guide a laser beam (generally termed, including low coherent light beam) thereon to produce reflection of the guided beam having different amplitudes and phase delays to cause interference between the laser beam and the reflected part of the guided beam for detection, in order to reproduce recorded information as a time-series signal waveform.

2. Description of the Related Art

As a conventional optical recording medium there is an optical disk which has a plurality of low-reflectance recesses aligned in series as recorded information on a high-reflectance flat reflecting film that is formed as a recording film on a disk-shaped substrate. With this optical recording medium in use, a laser beam is irradiated and converged on the row of recesses to detect the difference between the amount of reflected light from the reflecting film and that of each recess as recorded information. Another type of optical recording medium is a photomagnetic disk which has a plurality of minute magnetism-inverted regions aligned on a uniaxial-magnetic anisotropic recording film to record information. With this optical recording medium in use, the difference between the rotational angles of the polarizing planes of the reflected lights from the magnetization-inverted regions is detected as recorded information.

As information is reproduced from those optical recording media by utilizing the reflected light from the row of recesses or magnetization-inverted regions serving as a recording portion, there is a limit to the surface density of the recording portion. At the time of information reproduction from those optical recording media, the focal point of the laser beam is shifted along the optical axis so as to follow up the surface vibration of the optical recording media. The proper focusing is however necessary for each spot of the recording portion. Further, as the reflectance of the reflected light and the rotational angle of the polarizing plane are very small, the signal-to-noise (S/N) ratio of an optical signal to be detected is low. In addition, as a time-series signal is reproduced only by the movement of a row of recording portions, the access time for information reproduction and recording is restricted by the moving speed of the optical recording medium.

Japanese Unexamined Patent Publication No. 2-210627 discloses an optical waveguide recording medium and a playing apparatus therefor which have been developed to overcome the above shortcomings.

A playing apparatus for an optical waveguide recording medium has been proposed which has a Michelson interferometer type optical heterodyne detecting optical system. This playing apparatus comprises a collimator lens for converting a radial laser beam from a light source into a flux of parallel light, a half mirror for causing divergence of a laser beam to be guided on an optical waveguide recording medium, an objective lens for coupling one part of the divergent laser beam to an optical waveguide, a movable mirror for causing a phase shift and a frequency shift on the other part of the divergent laser beam to provide reference light, and a photodetector for causing interference between the signal light reflected by and returning from refractive index discontinuous portions formed on the optical waveguide and the reference light for heterodyne detection of the optical output.

Since this playing apparatus utilizes the movable mirror as a means to subject the divided laser beam to phase shift and frequency modulation for heterodyne detection, the modulation frequency is limited, thus restricting the improvement of the information recording density. What is more, the presence of the mirror driving section impedes miniaturization of the reproducing optical system and improvement of its reliability.

SUMMARY OF THE INVENTION

It is therefore an object of the present invention to provide an optical waveguide recording medium playing apparatus having a miniaturized reproducing optical system.

According to the present invention, there is provided a playing apparatus for reproducing information from an optical waveguide recording medium provided with an optical waveguide having a photocoupler for guiding a laser beam and a plurality of refractive index discontinuous portions aligned on the optical waveguide, shapes and relative positions of the refractive index discontinuous portions being variables of information to be recorded, which apparatus comprises:

a light emitting means for generating a laser beam;

a beam splitting means for bisecting the laser beam into first and second light beams;

a reference light generating means for receiving the first light beam and reflecting the first light beam as reference light;

an irradiating means for guiding the second light beam to the photocoupler;

a light superimposing means for superimposing reflected signal light, reflected at the refractive index discontinuous portions, subjected to amplitude and phase modulation, and returning via the photocoupler, onto the reference light to produce interference light;

a photodetecting means for performing photoelectric conversion of the interference light to provide an electric output; and an optical frequency modulating element, provided between the light emitting means and the beam splitting means, for modulating a frequency of the laser beam.

According to the present invention, an optical waveguide recording medium playing apparatus having a miniaturized reproducing optical system can be provided.

DETAILED DESCRIPTION OF THE PREFERRED EMBODIMENT

A preferred embodiment of the present invention will now be described referring to the accompanying drawings.

Figure 1A:
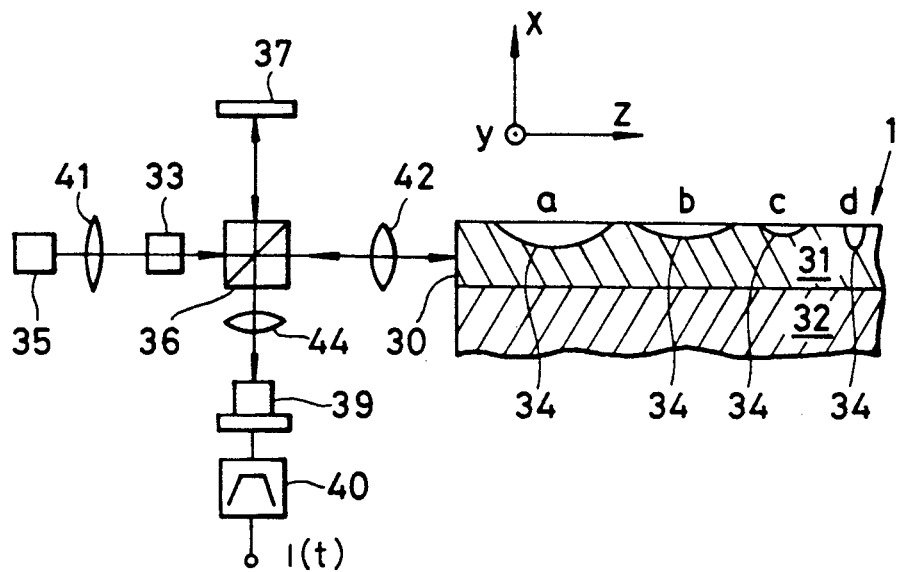
FIG. 1A is a schematic diagram for explaining the principle of an optical waveguide recording medium according to the present invention.

FIG. 1 is a diagram for explaining the principle of the present invention. In FIG. 1A, an optical waveguide recording medium 1 has such a structure that an optical waveguide of a core 31 where light is guided is formed on a substrate 32 as a clad with a lower refractive index than that of the core. Air or another clad exists on the upper interface of the core 31. The end surface of the core 31 serves as a photocoupler 30 which guides a laser beam into the interior of the core. A plurality of refractive index discontinuous portions 34 are provided and arranged on the upper interface of the inner surface of the core in the lengthwise direction thereof as recorded information. The refractive index discontinuous portions 34 are tiny recesses which provide, with respect to the laser beam guided to enter the optical waveguide, reflection of the guided beam having various amplitudes and phases (i.e., signal light with modulated amplitudes and phases) in accordance with complex reflectances dependent on their relative positions from the photocoupler 30 at an end face and their shapes. Such shapes and positions of the refractive index discontinuous portions 34 are recorded to provide predetermined complex reflectances according to information to be recorded. The recesses of the refractive index discontinuous portions 34 may be provided as embedded portions. If air or clads whose refractive indices are smaller than that of the core are used as the embedded portions, the refractive index discontinuous portions 34 are of, for example, semicircular or semielliptic embedded type and are several fractions to several times larger than the light wavelength. The core 31 is formed of, for example, a transparent polycarbonate, and the clad formed of a polymer material, such as polymethyl methacrylate with a lower refractive index than that of polycarbonate. In short, the optical waveguide recording medium 1 comprises at least the photocoupler 30, the core 31, the substrate 32 and the refractive index discontinuous portions 34.

Figure 2:
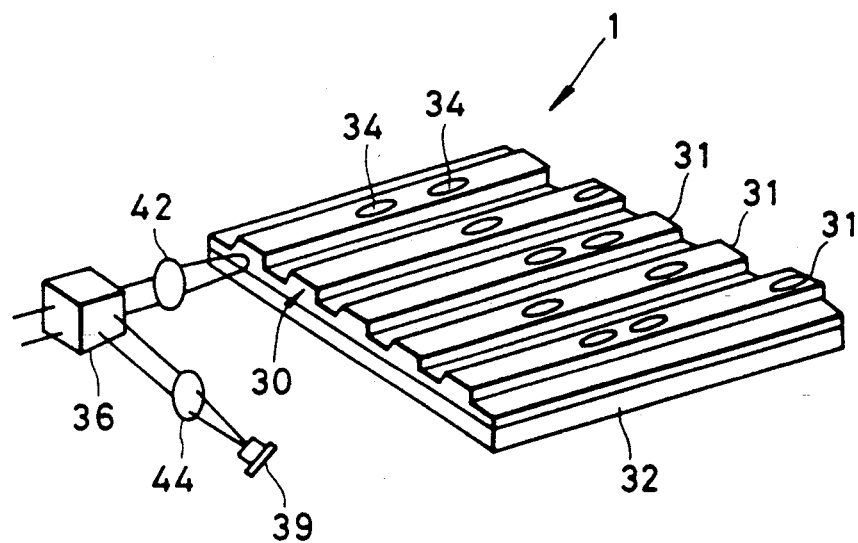
FIG. 2 is a perspective view of the optical waveguide recording medium of the present invention.

FIG. 2 specifically shows another type of optical waveguide recording medium 1. This recording medium 1 is designed in such a way that a plurality of channel type ridge waveguides 31 each having a photocoupler 30 are arranged in parallel on a substrate 32, and a plurality of tiny refractive index discontinuous portions 34 which provide reflection of guided light with different amplitudes and phases are provided in the core of the optical waveguide 31 in accordance with information to be recorded. Although the ridge waveguides are used for description in this embodiment, they may be of another channel type, such as a strip or embedded type. As long as the optical waveguides are of such types, if the refractive index discontinuous portions 34 are formed on the core or the clad for each optical waveguide, the same effect as realized by the ridge waveguide can be provided.

As shown in FIG. 1A, in an optical waveguide recording medium playing apparatus according to the present invention, an optical frequency modulating element 33, which frequency-modulates a laser beam, is located between a light-emitting element 35 as a light-emitting means, such as an SLD (Super Luminescent Diode) or a laser diode for generating a laser beam of a broad-band wavelength, and a half mirror (beam splitter) 36 as a beam splitting means, which bisects the laser beam into first and second light beams, with a collimator lens 41 disposed between the modulating element 33 and the light-emitting element 35. The optical waveguide recording medium playing apparatus further comprises a fixed mirror 37 as a reference light generating means which receives the first laser beam and generates reference light, an objective lens 42 as an irradiating means which guides the second laser beam to the photocoupler 30, the half mirror 36 serving as a light superimposing means which superimposes reflected signal light returning from the refractive index discontinuous portions 34 onto the reference light to provide interference light, and a photodetector 39 as a photodetecting means which performs photoelectric conversion of the interference light to provide an electric output.

Figure 3A:
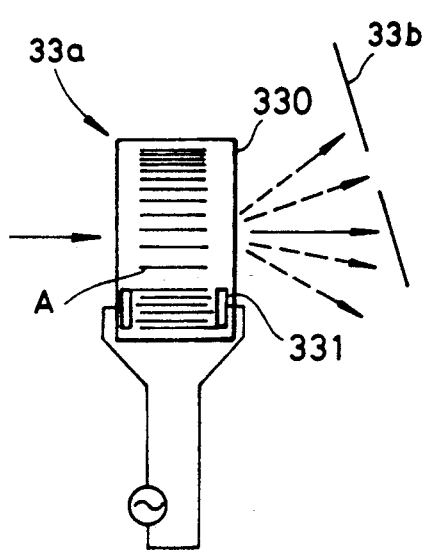
FIGS. 3A, 3B, 4A and 4B are plan views illustrating acoustooptic modulating elements according to the present invention.
Figure 3B:
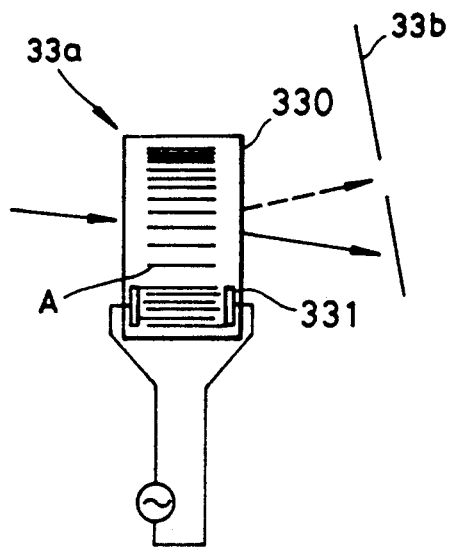

As shown in FIG. 3, the optical frequency modulating element 33 comprises an acoustooptic modulating element 33a, such as a surface elastic wave element, which is driven by a frequency-modulated, high-frequency signal to diffract a laser beam, and a fixed slit member 33b having an opening (slit) provided where part of the diffracted laser beam, e.g., the primary diffracted light, passes. The diffracted laser beam may be allowed to be incident in parallel to the surface of a surface elastic wave A in order to utilize the Debye-Sears effect as shown in FIG. 3A, or allowed to be incident at a certain angle satisfying the Bragg condition with respect to the surface of the surface elastic wave A in order to utilize the Bragg diffraction as shown in FIG. 3B. The surface elastic wave element 33a has a transducer 331 provided on a thin-film optical waveguide 330. The use of this surface elastic wave element can permit the lens, half mirror and the like to be integrated on a single substrate, thus miniaturizing the optical head of the playing apparatus.

Figure 4:
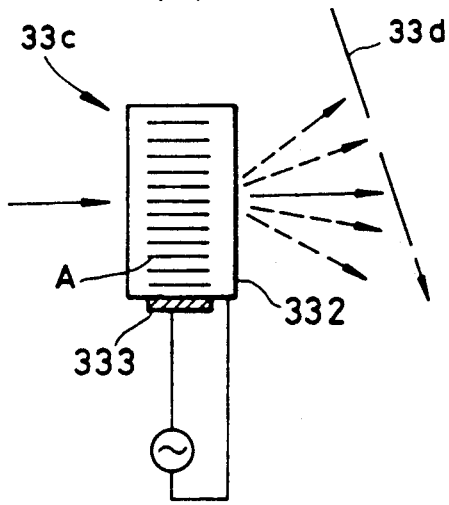
Figure 4:
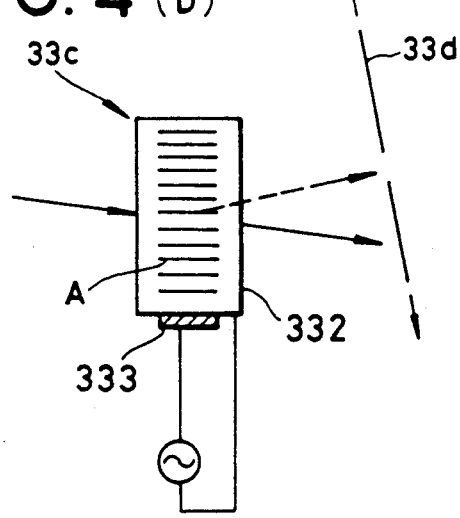

Alternatively, as shown in FIG. 4, the optical frequency modulating element 33 may comprise an acoustooptic modulating element 33c, such as an acoustooptic modulator, which is driven by a signal of a given high frequency to diffract a laser beam, and a movable slit member 33d having an opening (slit) provided where part of the diffracted laser beam, e.g., the primary diffracted light, passes. The use of the movable slit member 33d allows the desired diffracted light to be selectively sent to the half mirror. The diffracted laser beam may be allowed to be incident in parallel to the surface of a surface elastic wave A in order to utilize the Debye-Sears effect as shown in FIG. 4A, or allowed to be incident at a certain angle satisfying the Bragg condition with respect to the surface of the surface elastic wave A in order to utilize the Bragg diffraction as shown in FIG. 4B. The acoustooptic modulator 33a is constituted by providing a piezoelectric element 333 for generating an ultrasonic wave on one end face of a block of a transparent ultrasonic propagating medium 332.

Figure 1B:
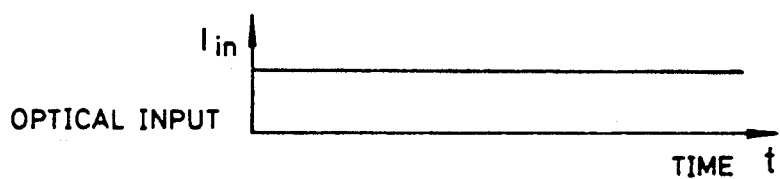
FIGS. 1B and 1C show an electric output I(t) with a time-series waveform with respect to a light input Iin of the laser beam with constant intensity.
Figure 1C:
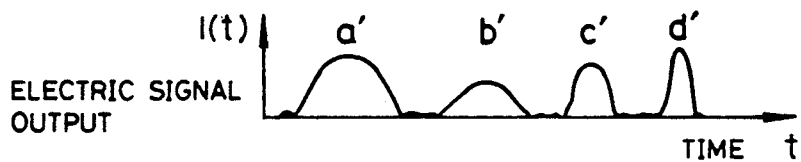

The laser beam emanating from the light-emitting element 35 disposed facing the photocoupler 30 of the optical waveguide recording medium 1 is converted into a flux of nearly parallel light by the collimator lens 41, and is then bisected by the half mirror 36. The first laser beam, one of the bisected laser beams, traveling straight is converged by the objective lens 42 and guided through the photocoupler 30 into the optical waveguide. Part of the guided light becomes reflected light having a plurality of different amplitudes and phases due to the refractive index discontinuous portions 34, and this reflected light will be signal light returning from the photocoupler 30. When a plurality of refractive index discontinuous portions 34 are provided as information to be recorded in the optical waveguide 31 at positions a, b, c and d as shown in FIG. 1A (the information is illustrated as analog information in this diagram), the shapes and the relative positions of the refractive index discontinuous portions 34 can produce modulated signal light having information of different amplitudes and phase as a function of the shape and propagation distance according to the information to be recorded. The other second laser beam split and reflected by the half mirror 36 is reflected as reference light by the fixed mirror 37, returning to the half mirror 36. The signal light and reference light the combined by the half mirror 36, and is converged by the lens 44 to be an optical homodyne interference input to the photodetector 39. This input light is photoelectrically converted to be an electric signal, which in turn passes through a frequency filter 40, yielding an electric output I(t) with a time-series waveform with respect to a light input sIin of the laser beam of a constant intensity from the light-emitting element 35, as shown in FIGS. 1B and 1C.

In short, the playing apparatus embodying the present invention is characterized in that the optical frequency modulating element comprising the acoustooptic modulating element for frequency-modulating a laser beam and the slit member is provided between the super luminescent diode (SLD) and the objective lens for converging light on the photocoupler of the optical waveguide of the optical waveguide recording medium in order to read recorded information therefrom. The optical frequency modulating element drives the acoustooptic modulating element with a frequency-modulated drive voltage to diffract a laser beam, and part of the diffracted laser beam passes through the opening of the slit member so that its spatial frequency spectrum may be limited by the slit member. With the use of the acoustooptic modulating element 33a as shown in FIG. 3, since the voltage to drive this modulating element is frequency-modulated, the pitch of an elastic wave formed in the acoustooptic modulating element 33 will be modulated. This varies the diffraction angle of the laser beam of the same frequency, thus changing the frequency of light that passes through the opening of the slit member. With the use of the acoustooptic modulating element as shown in FIG. 4, since the diffracted light is selected using the movable slit member, the frequency of light that passes through the opening of the movable slit member is also altered.

As the wavelength spectrum of the laser beam emanating from the SLD can be selected by the relative movement of the slit member to the desired diffracted light according to this embodiment, therefore, the intensity I (z, t) of the light that is to be detected by the photodetector is expressed by the following equation 1 due to the interference between the reference light and the signal light returning from the photocoupler of the optical wavelength of the optical waveguide recording medium.

$$|E^*_{ref} Es|(k) \int R(z)\cos(2\pi ft - 4\pi f'Z/c)dz \quad (1)$$

Here the oscillation frequency of the diffracted laser beam having passed through the optical frequency modulating element is factorized as given in the following equation 2.

$$f' = fo + m(t)fs/2 \quad (2)$$

Solving the equation for the component f yields the following equation 3 for the intensity I of the signal light.

$$|E^*_{ref} \; Es|_f \quad \int R(z)\cos(2\pi ft - 4\pi(f_o + m(t)fs/2)Z/c)dz \Big|_f \quad (3)$$

$$\propto \int R(z) \sum_{\substack{i=-N \\ i \neq 0}}^{N} \cos(2\pi ifsz/c)dz \; \cos(2\pi ft - 4\pi foz) =$$

$$\int R(z)\cos[(N+1)\pi fsz/c] \frac{\sin(N\pi tsz/c)}{\sin(\pi tsz/c)}$$

wherein R(z) is the amplitude distribution of the reflected light from the optical frequency modulating element. Sweeping fs one can see from which position z the light has been reflected. The diffracted laser beam having passed through the optical frequency modulating element sweeps fs in accordance with the relative movement of the opening of the slit member to the laser beam, so that the reflected signal light from m-th refractive index discontinuous portion of the photocoupler of the optical waveguide of the optical waveguide recording medium can be detected by detecting the beat signal of the photodetector.

With the above-described structure of the playing apparatus, a plurality of refractive index discontinuous portions (indicated by a, b, c and d in FIG. 1A) recorded on the optical waveguide recording medium are reproduced in association with the electric outputs with a time-series waveform (corresponding to a', b', c' and d' in FIG. 1C). As the aforementioned light source is used for the light-emitting element 35, this optical system can set a higher modulated frequency than an optical system employing a semiconductor laser.

Figure 5:
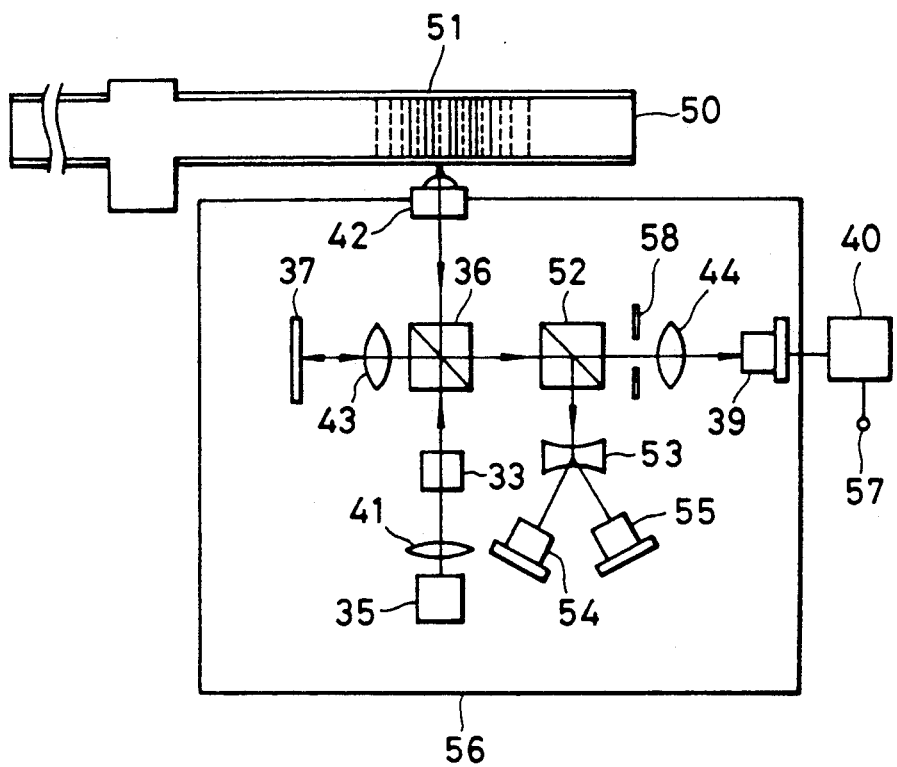
FIG. 5 is a schematic diagram illustrating an optical waveguide recording medium playing apparatus according to one embodiment of the present invention.

FIG. 5 specifically illustrates an optical waveguide recording medium and a playing apparatus. An optical waveguide recording medium 50 is a three-dimensional (3D) optical disk of a laminated drum type which comprises a multitude of plates 51, each being the above-described channel type ridge optical waveguide recording medium 1, put side by side and rolled into a drum. In addition to the aforementioned constituents, this playing apparatus comprises a converging lens 42, disposed in a focus actuator, for coupling a laser beam to the optical waveguide, a beam splitter 52 for extracting part of a reflected beam for the tracking purpose, a concave lens 53 for separating the tracking laser beam, and tracking photodetectors 54 and 55. The reflected light acquired by abutting both end portions of the elliptic cross section of the laser beam from the light-emitting element 35 along its longer axis against the clad end face with the photocoupler (the end face of the core) is used as the tracking laser beam. The photodetectors 54 and 55 can catch the tracking laser beam at high sensitivity and high S/N ratio even in optical homodyne detection. The converging microlens 42 or the like is moved along the optical axis to focus the tracking laser beam on the photocoupler of the optical waveguide in accordance with the error between the detected outputs of both photodetectors 54 and 55, and an optical play head 56 is allowed to follow up the surface vibration of the 3D optical disk 50.

According to this embodiment, plates having 10 mm long optical waveguides with a rectangular horizontal cross section of 2×2 μm embedded in a 3.2-μm thick clad at intervals of 2 μm are rolled and laminated into a drum to provide the 3D optical disk 50 with a tracking pitch width of 3.2 μm. The recorded refractive index discontinuous portions have lengths of 10 to 30 μm along the z axis, depths of 0.1 to 0.5 μm along the x axis, and widths of about 0.7 μm along the y axis; an average of 500 such refractive index discontinuous portions are recorded for each optical waveguide. Since the reflectances of the individual refractive index discontinuous portions are set at $10^{-6}$ to $10^{-8}$ at most, the damping factor of thee last returning laser beam will be about 10% even with their reflection losses considered. In FIG. 5 the cross section of each optical waveguide is open to the lower end face of the 3D optical disk 50 to be the photocoupler. The surface of the photocoupler is coated with a polycarbonate protective film of 2 mm thick to match its refractive index with that of the optical waveguide, thereby improving the degree of the photocoupling. The end face of the waveguide is also protectively coated to allow simultaneously the light propagating through the waveguide to escape. Such 3D optical disk 50 has a diameter of eight inches, and as in the case of a compact disk (CD) recorded information is reproduced while it is rotating.

The optical waveguide recording medium playing apparatus is designed as already described in SUMMARY OF THE INVENTION. The laser beam from the light-emitting element 35 is guided to the optical waveguide recording medium 51. Part of the laser beam is subjected to amplitude and phase modulation to be a signal-reflected laser beam and return to the half mirror 36 while the other part of the laser beam reaches the fixed mirror 37 and returns therefrom to the half mirror 36 through lens 43. These beam components are combined by the half mirror 36, and the resultant beam reaches, via an iris 58 which passes only interference light, the photodetector 39 for photo-detection. The output of the photodetector 39 is sent through the frequency filter 40 to an electric output terminal 57 from which an electric output with the time-series signal waveform as indicated by I(t) in FIG. 1C will be acquired. The reproduced signal from one optical waveguide recording medium is temporarily accumulated in a buffer memory, and is transferred therefrom at an arbitrary clock time. After information recorded in one optical waveguide is read out, information recorded on the optical waveguide of the next channel will consecutively be read out by performing the tracking of the head 56 of the optical playing apparatus while rotating the 3D optical disk 50.

While the foregoing description of this embodiment discusses optical homodyne detection being conducted by using the fixed mirror 37 as the reference light generating means in the reproducing optical system, it may be replaced with, for example, an acoustooptic modulator which frequency-modulates the reference light to realize optical heterodyne detection. In this case the same effect as produced by the former case can be provided.

The foregoing description of this embodiment has been given with reference to an example where the memory portion of the optical waveguide recording medium is constituted by long and short, large and small refractive index discontinuous portions and an analog signal is stored in the memory portion and reproduced therefrom. If refractive index discontinuous portions of the same size are arranged at equal intervals to record the presence or absence of such portions, storage and reproduction of a digital signal will also be obviously possible. Further, while the foregoing description discusses optical waveguide recording media formed into a 3D optical disk, they may be laminated one on another in the form of a tape or a card. In addition, although the length of the optical waveguide is set to 10 mm in this embodiment, it may be made longer or shorter in accordance with the necessary memory capacity.

As described above, according to the present invention, in an optical waveguide recording medium playing apparatus comprising a light emitting means for generating a laser beam, a beam splitting means for bisecting the laser beam into first and second light beams, a reference light generating means for receiving the first light beam and reflecting the first light beam as reference light, an irradiating means for guiding the second light beam to the photocoupler, a light superimposing means for superimposing reflected signal light, reflected at the refractive index discontinuous portions, subjected to amplitude and phase modulation, and returning via the photocoupler, onto the reference light to produce interference light, and a photodetecting means for performing photoelectric conversion of the interference light to provide an electric output, an optical frequency modulating element for modulating the frequency of the laser beam is provided between the light emitting means and the beam splitting means. This design can miniaturize the reproducing optical system of the optical waveguide recording medium playing apparatus.

What is claimed is:

1. A playing apparatus for reproducing information from an optical waveguide recording medium provided with an optical waveguide having a photocoupler for guiding a laser beam and a plurality of refractive index discontinuous portions aligned on the optical waveguide, shapes and relative positions of the plurality of refractive index discontinuous portions being variables of information to be recorded, the apparatus comprising:

a light emitting means for generating a laser beam;
    a beam splitting means for bisecting the light beam into first and second laser beams;
    a reference light generating means for receiving the first laser beam and reflecting the first light beam as reference light;
    an irradiating means for guiding the second laser beam to the photocoupler;
    a light superimposing means for superimposing reflected signal light, reflected at the plurality of refractive index discontinuous portions, subjected to amplitude and phase modulation, and returning via the photocoupler, onto the reference light to produce interference light;
    a photodetecting means for performing photoelectric conversion of the interference light to provide an electric output; and
    an optical frequency modulating element, provided between the light emitting means and the beam splitting means, for modulating a frequency of the laser beam.

2. A playing apparatus according to claim 1, wherein the optical frequency modulating element includes an acoustooptic modulating element to be driven by a frequency-modulated, high-frequency signal to diffract the laser beam, and a fixed slit member having an opening to permit part of the diffracted laser beam to pass through.

3. A playing apparatus according to claim 1, wherein the optical frequency modulating element includes an acoustooptic modulating element for diffracting the laser beam, and a movable slit member having an opening to permit part of the diffracted laser beam to pass through.

4. A playing apparatus according to claim 1, wherein the reference light generating means has a fixed mirror.

5. A playing apparatus according to claim 1, wherein the light emitting means has a super luminescent diode or a laser diode of a broad-band wavelength.

6. A playing apparatus according to claim 1, wherein the beam splitting means has a half mirror or a beam splitter.

7. A playing apparatus according to claim 1, wherein the irradiating means has an objective lens.

8. A playing apparatus according to claim 1, wherein the light superimposing means has a half mirror or a beam splitter.

9. A playing apparatus according to claim 1, wherein the photodetecting means has a photodetector.

* * * * *